United States Patent Office 2,897,524
Patented Aug. 4, 1959

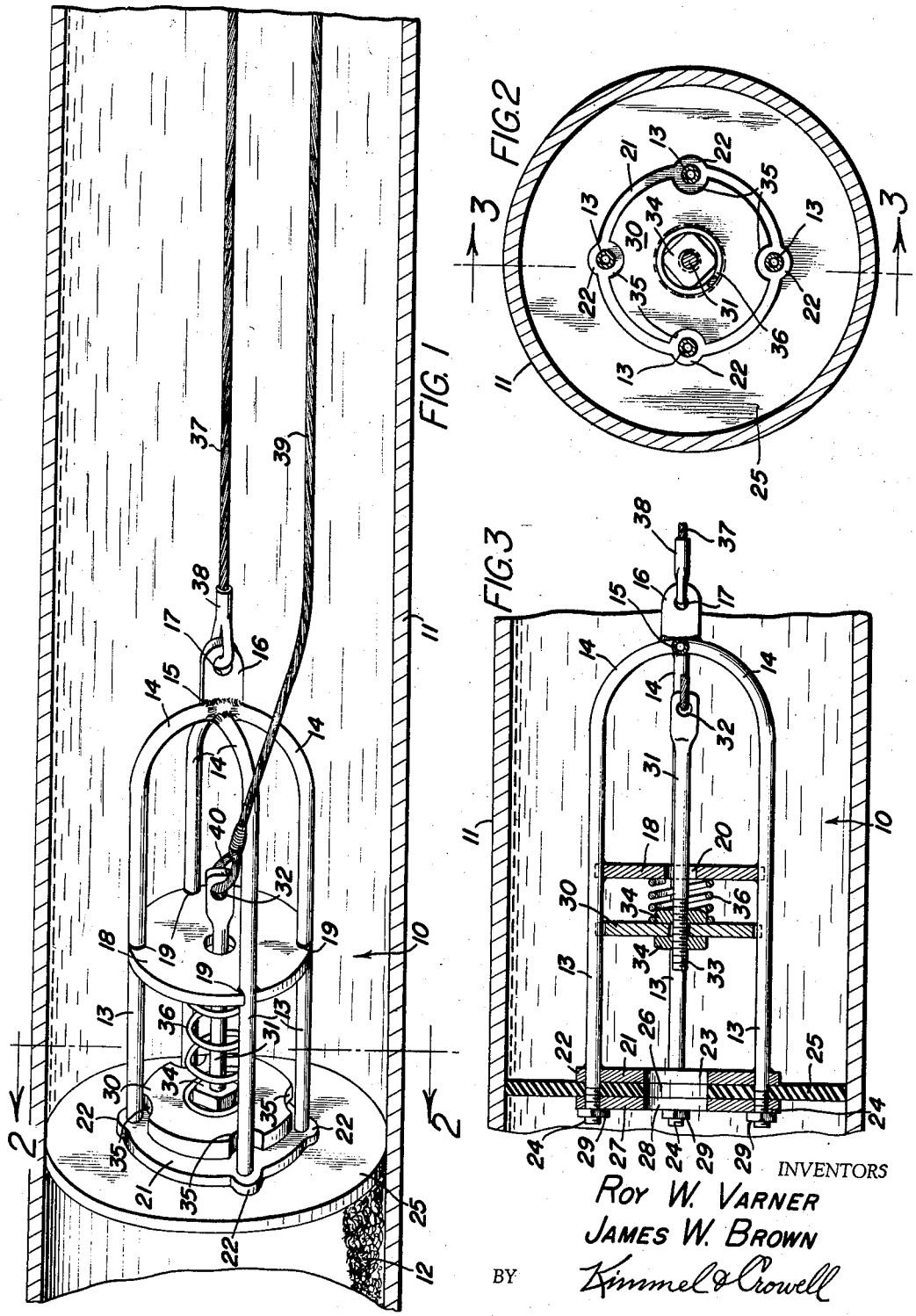
Aug. 4, 1959    R. W. VARNER ET AL    2,897,524
SEWER CLEAN-OUT TOOL
Filed April 3, 1958
INVENTORS
Roy W. Varner
James W. Brown
BY Kimmel & Crowell
ATTORNEYS

2,897,524

SEWER CLEAN-OUT TOOL

Roy W. Varner and James W. Brown, Abilene, Tex.

Application April 3, 1958, Serial No. 726,243

5 Claims. (Cl. 15—104.3)

The present invention relates to sewer clean-out tools, and particularly to tools which utilize water pressure.

The primary object of the invention is to provide a sewer clean-out tool which is moved through the sewer by water pressure within the sewer pipe.

Another object of the invention is to provide a sewer clean-out tool of the class described above having a valve therein for releasing the water pressure.

A further object of the invention is to provide a sewer clean-out tool having a valve for releasing the water pressure and having means for remotely controlling the valve.

Other objects and advantages will become apparent in the following specification when considered in the light of the attached drawings, in which:

Figure 1 is a perspective view of the invention shown in position in a sewer pipe line, partially broken away and in section for convenience of illustration.

Figure 2 is a transverse sectional view taken along the line 2—2 of Figure 1, looking in the direction of the arrows.

Figure 3 is a longitudinal sectional view taken along the line 3—3 of Figure 2, looking in the direction of the arrows, and illustrating the valve in open position.

Referring now to the drawings in detail wherein like reference characters indicate like parts throughout the several figures, the reference numeral 10 indicates generally a sewer clean-out tool constructed in accordance with the invention.

The sewer clean-out tool 10 is normally used in a circular sewer pipe 11 of conventional construction and is intended for the removal of debris and other material such as is shown at 12 which has collected in the sewer pipe and interferes with its normal use.

The sewer clean-out tool 10 includes a plurality of spaced apart parallel tubular frame members 13 each having an arcuate end portion 14 converging inwardly and joined together at 15 by welding or the like. The frame members 13 have an ear 16 secured thereto at their juncture 15 and provided with a bore 17.

A circular plate 18 is positioned intermediate the opposite ends of the frame members 13 centrally thereof. The frame members 13 extend through notches 19 formed in the peripheral edge of the plate 18, and the plate 18 is welded to the frame members 13 in perpendicularly extending relation thereto. The plate 18 has an axial bore 20 formed therein for reasons to be assigned.

A generally circular plate 21 is arranged parallel to the plate 18 adjacent the end of the frame members 13 opposite ears 16. The plate 21 is provided with a plurality of peripheral ears 22 through which the frame members 13 extend. The plate 21 is welded to the frame members 13 adjacent to but spaced from the ends thereof opposite the ear 16. The plate 21 has an axial bore 23 having a diameter somewhat greater than the bore 20 in the plate 18.

The frame members 13 each have threaded end portions 24 opposite the arcuate portions 14. A flexible disk 25 is provided with an axial bore 26 of the same dimension as the bore 23 in the plate 21 and is positioned in axially aligned relation in contact with the plate 21 with the threaded end portions 24 of the frame members 13 extending therethrough.

A plate 27 of identical construction to the plate 21 has an axial bore 28 of the same diameter as the bores 23, 26. The plate 27 is engaged over the threaded ends 24 of the frame members 13 in contact with the side of the flexible disk 25 opposite the plate 21. Nuts 29 threaded onto the threaded end portions 24 of the frame members 13 secure the plate 27 in clamping engagement with the flexible disk 25.

A generally circular valve disk 30 is arranged medially of the frame members 13 intermediate the plate 18 and the plate 21. A valve stem 31 extends through the bore 20 in the plate 18 and has a transverse bore 32 formed in the end thereof adjacent the ear 16. The valve stem 31 has a threaded extension 33 at the end thereof opposite the bore 32 and the valve disk 30 is secured to the valve stem 31 by a pair of opposed nuts 34 engaged on opposite sides of the valve disk 30.

The valve disk 30 is provided with a notch 35 in the peripheral edge thereof to loosely engage with each of the frame members 13 to guide the valve disk 30 into sealing relation with the plate 21, closing the bore 23 therethrough. A coil spring 36 encompasses the valve stem 31 engaging at one end the plate 18 and at the opposite end the valve disk 30 to normally maintain the valve disk 30 in sealing contact with the plate 21.

A cable 37 extends from a conventional winch (not shown) and is connected to the ear 16 through the bore 17 by means of a fitting 38. A control cable 39 extends from a control apparatus (not shown) and has a loop 40 on its terminal end engaged through the bore 32 in the valve stem 31 to provide means for moving the valve disk 30 in a direction toward the plate 18 against the tension of the spring 36 to open the bore 23 through the plate 21 and permit flow of water past the flexible disk 25.

In the use and operation of the invention, the clean-out tool 10 is placed in a sewer pipe 11 and water is inserted therein under pressure to force the flexible disk 25 along the sewer pipe 11 in a direction from right to left, as viewed in Figures 1 and 3.

The flexible disk 25 moves the debris 12 along the sewer pipe 11 until the accumulation thereof overcomes the force of the water in the pipe, retarding the forward movement of the flexible disk 25. When this occurs, the valve disk 30 is moved away from the plate 21 by drawing on the cable 39 permitting water to flow through the bore 23 of the plate 21 to wash the debris 12 away from in front of the flexible disk 25.

Should this not be effective in removing the debris 12, the valve disk 30 is closed quickly with a snap action, creating a shock pressure against the flexible disk 25 so as to apply extra pressure to the debris 12.

Having thus described the preferred embodiment of the invention, it should be understood that numerous structural modifications and adaptations may be resorted to without departing from the scope of the appended claims.

What is claimed is:

1. A sewer clean-out tool for passage through elongated sewer pipes comprising a frame including a plurality of spaced apart parallel longitudinally extending frame members, a circular plate extending transversely of said frame intermediate the opposite ends thereof and secured to each of said frame members, a second circular plate extending parallel to said first circular plate and secured to said frame adjacent one end thereof, a flexible disk engaging said second plate, means detachably secured to said frame clamping said flexible disk to said second plate, said last named means, said flexible disk and said second named plate having an axial bore extending therethrough, a valve mounted on said frame for closing said bore, a cable secured to said frame for controlling the movement of said tool, and a control cable for opening said valve secured to said valve whereby water pressure bearing against said tool may be released.

2. A device as claimed in claim 1 wherein said valve includes a valve disk, an elongated longitudinally extending valve stem secured to said disk, and a coil spring encompassing said valve stem engaging at one end said first named circular plate and at the other end said valve disk normally biasing said valve disk in a direction to close said bore.

3. A device as claimed in claim 1 wherein said frame members at the end thereof opposite said flexible disk are provided with arcuate converging portions secured together, and an ear is secured to said frame at the end thereof opposite said flexible disk, said first named cable being connected to said ear.

4. A device as claimed in claim 3 wherein said valve disk is provided with a plurality of peripheral notches for loosely engaging said frame members.

5. A device as claimed in claim 1 wherein the means clamping said flexible disk to said second named plate comprises a third plate identical to said second plate, said frame members being threaded, and a plurality of nuts engaging over the threaded ends of said frame members securing said third plate in clamping engagement to said flexible disk.

References Cited in the file of this patent
UNITED STATES PATENTS

| | | |
|---|---|---|
| 280 | Heckman | July 17, 1837 |
| 172,440 | Hovey | Jan. 18, 1876 |
| 173,980 | Marcy | Feb. 22, 1876 |
| 892,594 | Killian | July 7, 1908 |
| 2,198,823 | Kelpsh | Apr. 30, 1940 |
| 2,633,808 | Webber | Apr. 7, 1953 |